United States Patent [19]
Kueffer

[11] Patent Number: 5,012,841
[45] Date of Patent: May 7, 1991

[54] PRESSURE REDUCING AND CONDITIONING VALVES

[75] Inventor: Max Kueffer, Blue Bell, Pa.

[73] Assignee: Keystone International Holdings Corp., Wilmington, Del.

[21] Appl. No.: 398,200

[22] Filed: Aug. 24, 1989

[51] Int. Cl.$^5$ ............................................. F16K 11/07
[52] U.S. Cl. ............................. 137/625.39; 137/625.4; 137/896
[58] Field of Search ....................... 137/625.38, 625.39, 137/625.4, 896

[56] References Cited

U.S. PATENT DOCUMENTS

| | | |
|---|---|---|
| 2,354,842 | 8/1944 | Spence . |
| 3,050,262 | 8/1962 | Curtis . |
| 3,220,708 | 11/1965 | Matsui . |
| 3,318,321 | 5/1967 | Odendahl . |
| 3,331,590 | 7/1978 | Battenfeld et al. . |
| 4,128,109 | 12/1978 | Chervenak et al. . |
| 4,397,331 | 8/1983 | Medlar ........................ 137/625.38 X |
| 4,413,646 | 11/1983 | Platt et al. . |
| 4,505,865 | 3/1985 | Wüllenkord ................. 137/625.4 X |
| 4,718,456 | 1/1988 | Schoonover .................. 137/625.4 X |
| 4,739,795 | 4/1988 | Ewbank et al. ................ 137/625.38 |

FOREIGN PATENT DOCUMENTS

| | | | |
|---|---|---|---|
| 3717128 | 12/1988 | Fed. Rep. of Germany ... | 137/625.4 |
| 153082 | 7/1986 | Japan ................................. | 137/625.4 |

OTHER PUBLICATIONS

"SteamForm" Conditioning Valves, Yarway Corporation, 1981.
"Copes-Vulcon", SA-35 Steam Atomizing Desuperheater, White Consolidated Industries (1977).
Celmet High Porosity Metal, Sumitomo Electric Industries, Ltd.

Primary Examiner—Stephen M. Hepperle
Attorney, Agent, or Firm—Ferrill and Logan

[57] ABSTRACT

Pressure reduction and conditioning valve for simultaneously reducing the pressure and temperature of steam. The invention comprises a valve body divided into first and second chambers, the first chamber having an inlet port for the introduction of superheated steam under high pressure into said conditioning valve and the second chamber having an outlet port for expelling desuperheated and depressurized steam out of said conditioning valve; an annular seat affixed to the interior of said valve between said first and second chambers; a hollow cylindrical cage slidably coupled with said seat, said cage permitting the flow of steam between said first and second chambers when said cage is in a first position and permitting a controlled leakage of steam when said cage is in a second position; and water stem means coupled to said cage for adjusting said cage between said first and second positions, said stem means having an outlet for injecting desuperheating water into said second chamber to be mixed with said steam.

6 Claims, 11 Drawing Sheets

INLET

PRESSURE REDUCING AND CONDITIONING VALVES

FIELD OF THE INVENTION

The present invention is directed to improved pressure reducing and conditioning valves for the simultaneous reduction of both steam pressure and temperature. Specifically, the present invention is directed to one-piece steam pressure reduction and conditioning valves having trim sizes of between one and two inches.

BACKGROUND OF THE INVENTION

The present invention is directed to improved pressure reducing and conditioning valves. Pressure reduction and conditioning valves have been developed to simultaneously reduce steam pressure and heat. Typically, pressure reducing and conditioning valves are utilized for precise temperature and pressure control in turbine by-pass, drying rolls, air preheater coils, unit tie lines, process reactors, fan drives, compressor drives, plant heating, fuel oil heating, evaporator supply, and atomizing steam.

Pressure reduction valves reduce the pressure of incoming steam. Steam conditioning valves operate by mixing superheated steam under high pressure with desuperheated steam or atomized water. A problem encountered with prior art pressure reducing and conditioning valves is that they are complex and difficult to control. A particular problem encountered with prior art conditioning valves was that conditioning occurs in proximity to the valve member. Such conditioning valves require complex structures to provide desuperheating steam or water directly into the valve member, and often failed to achieve uniform distribution of the atomized water or desuperheated steam. Prior art conditioning valves also accumulated condensate downstream of the valve members, and experienced water leakages. There has further been a need for conditioning and pressure reducing valves having trim diameters of approximately 1.0 to 2.0 inches. With the reduced trim diameter, the plug, stem and water outlet tube can be manufactured from a single piece, thereby facilitating manufacture and reducing cost.

In view of the above, it is an object of the present invention to provide pressure reducing and conditioning valves having trims with small enough diameters to permit the valve stem and plug to be fabricated from a single piece.

It is a further object of the present invention to provide pressure reducing and conditioning valve incorporating controlled steam leakage to heat the downstream side of the valve and to aid in the removal of condensate.

It is yet a further object of the present invention to provide pressure reducing and conditioning valves with improved water leakage control.

The present invention is directed to pressure reducing and conditioning valves having angled valve housings specifically designed to minimize thermal stresses and fatigue as well as to improve flow characteristics. Several embodiments of the invention incorporate an integral water proportioning system which supplies desuperheating water and which is designed to provide a fixed water to steam flow ratio proportional to the plug position and which is a function of the valve stroke. The invention further incorporates a system of labyrinths rather than piston rings. The labyrinth contains 6-10 grooves to reduce steam leakage between the trim and the bonnet for a balanced plug version. In addition, because of the reduced trim size, both plug and stem are manufactured out of a single piece.

The present invention, in its steam conditioning embodiments, incorporates a novel injection nozzle which uniformly distributes and atomizes the water within the high turbulence valve outlet area. The nozzle incorporates a swirling and accelerating chamber which helps to create a fine and consistent spray pattern. This feature assures complete atomization, and thereby optimizes evaporation and temperature control.

SUMMARY OF THE INVENTION

In accordance with the present invention, pressure reducing and steam conditioning valves for simultaneously reducing the pressure and temperature of incoming steam are disclosed. The invention comprises a valve body divided into first and second chambers, the first chamber having an inlet port for introducing superheated steam under high pressure into the conditioning valve, the second chamber having an outlet port for expelling depressurized (and steam and water) out of the conditioning valve. An annular seat is affixed to the interior of the valve body between the inlet and outlet ports. Cylindrical valve means is slidably matable within the annular seat, the cylindrical valve means extending between the first and second chambers, the cylindrical valve means further having a plurality of openings over a portion of its body to permit the flow of steam between said first and second chambers when the cylindrical valve means is in a first position, and permitting a controlled leakage of steam between said first and second chamber when the cylindrical valve means is in a second position. A water stem extends axially through the center of the cylindrical valve means and outer casing and terminates in the second chamber, the water stem transporting desuperheating water to the second chamber, the stem further being coupled to the cylindrical valve means and slidably adjusting the cylindrical valve means between the first and second positions. Finally, nozzle means located at the terminal end of the water stem injects desuperheating water into the second chamber to be mixed with steam entering the second chamber.

BRIEF DESCRIPTION OF THE DRAWINGS

The foregoing summary, as well as the following detailed description will be better understood when read in conjunction with the Figures appended hereto. For the purpose of illustrating the invention, there is shown in the drawings an embodiment which is presently preferred, it being understood, however, that this invention is not limited to the precise arrangement and instrumentalities shown.

DETAILED DESCRIPTION OF THE PREFERRED EMBODIMENT

Figure 1:
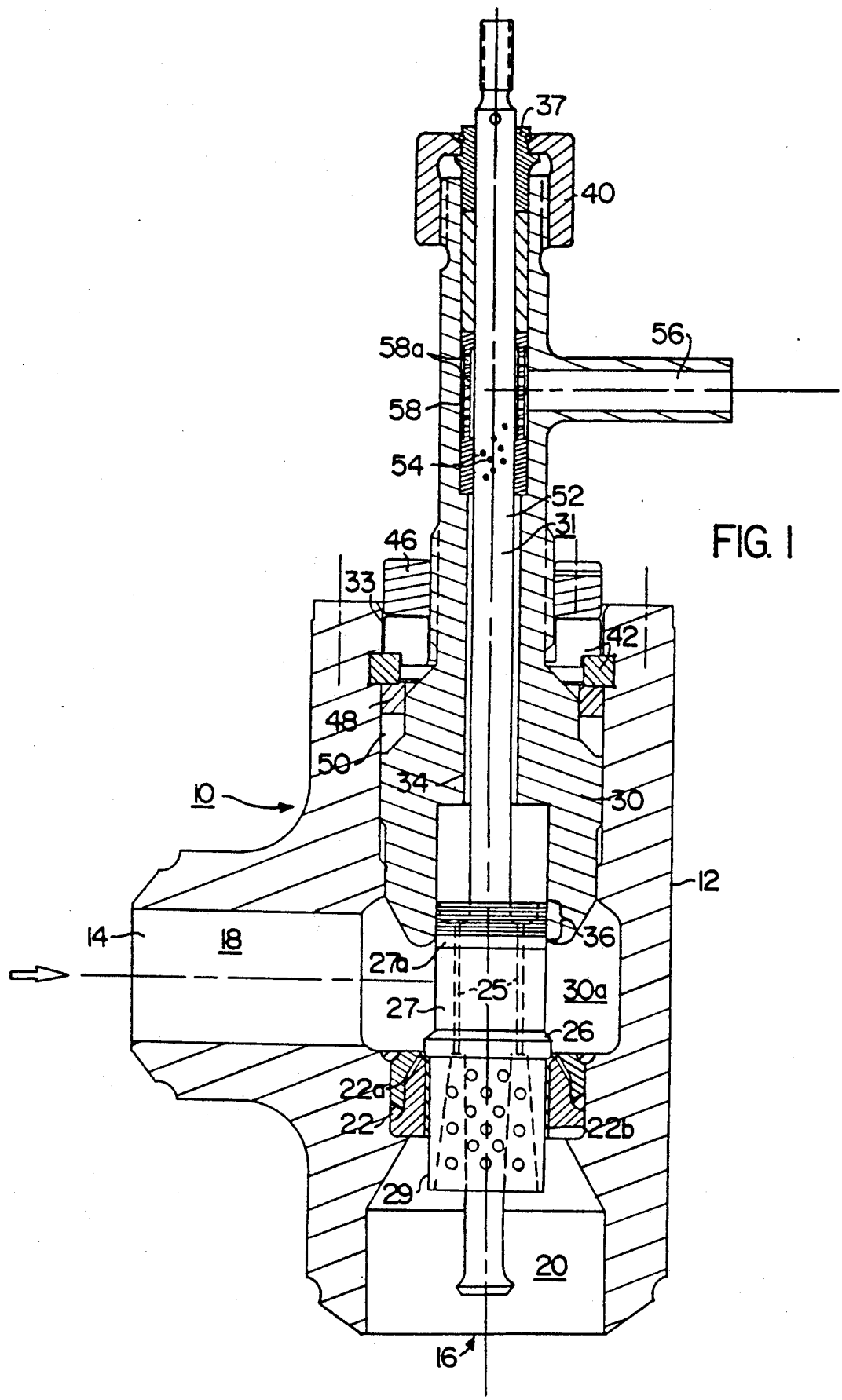
FIG. 1 is a section view of the conditioning valve of the preferred embodiment in a closed mode.
Figure 1A:
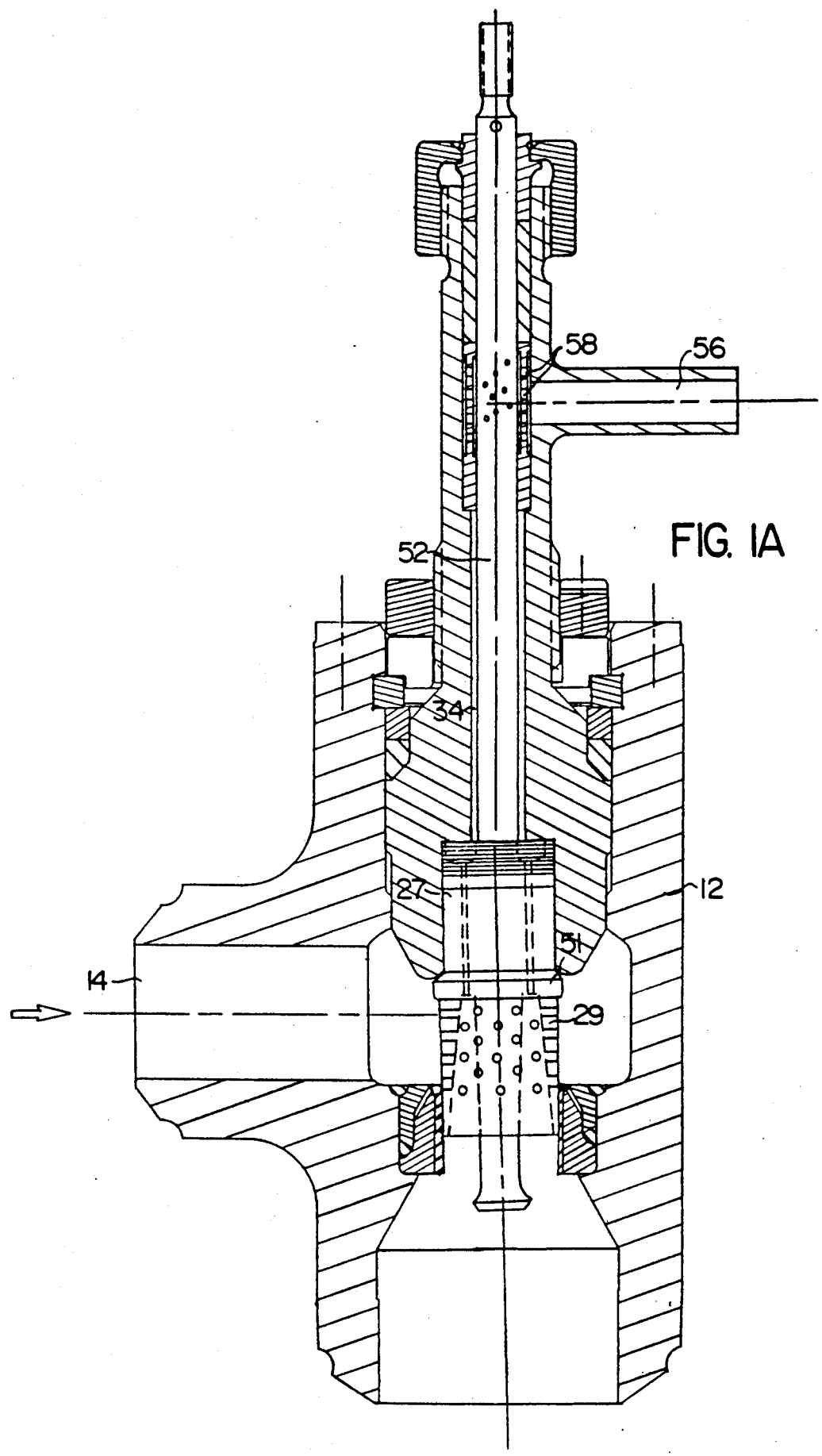
FIG. 1A is a section view of the conditioning valve of FIG. 1 in an open mode.

The present invention is described with reference to the enclosed Figures, wherein the same numbers are used where applicable. Referring to FIGS. 1 and 1A, an elevated section view of the conditioning valve of the preferred embodiment is shown. Valve 10 comprises an outer casing 12 which has an inlet port 14 for the injection of superheated steam and an outlet port 16 which expels desuperheated steam (and water) or reduced steam pressure. The casing is die forged, but may be cast as well. The casing therefore comprises an inlet chamber 18 and an outlet chamber 20. The chambers are divided by an annular seat 22 formed along an inwardly extending wall in the housing. The valve body is of angled design, and represents a safer, simpler and less expensive approach than in-line designs.

The plug assembly 26 as shown, comprises respective upper and lower cylindrical cage sections 27, 29 which mate with an annular seat 22, dividing the inlet and outlet chambers. A seal fixes the seat to the valve body. A flexible gap 22a permits thermal expansion. The valve seat is hard faced 22b and must be constructed to eliminate any leakage. The cylindrical cage 26 is divided into an upper substantially solid plug portion 27 and a perforated lower cage portion 29 through which superheated steam flows from the inlet chamber 18. The upper substantially solid plug portion contains apertures 25 so as to create a controlled leakage of pressurized steam through to the outlet chamber 20, in order to heat outlet chamber 20, thereby removing accumulated condensate and preventing thermal shock. Holes 25 also have a supplemental purpose. Because, as will be discussed in greater detail below, the conditioning valve utilizes a labyrinth to provide a controlled leakage, the pressure in the cavity 30a must be relieved in order to balance the plug. A balanced plug requires less energy to move, and therefore a smaller activator. The plug and the seat assembly function as a valve to control the flow of steam between the inlet and outlet chambers.

The valve housing has another opening 33 which supports a bonnet 30 and water stem assembly 31. The bonnet is constructed from heat resistent low alloyed carbon steel. The axial portion of the bonnet contains a bore 34 which retains a water stem 52. The bonnet 30 is retained within pressure sealed segmented rings 42 by a locking nut 46, and is further supported by a distance ring 48. Sealing is provided by the graphite packing ring 50. The valve includes a back seat 51 which provides a tight seal with the bonnet in the fully open position.

The upper cylindrical substantially solid plug 27 slides through a cavity 30a in the bonnet 30. Plug 27 contains a labyrinth 36 along its upper outer periphery 27a. The labyrinth 36 facilitates the sliding movement of the plug 27 within cavity 30a and also reduces superheated steam leakage from the inlet 19 into the cavity 30a. The water stem 52 extends through the bore 34 of bonnet 30, axially through the interior of the cylindrical cage 26, and into the outlet chamber 20. The water stem 52 contains at its upper end metering holes 54 which slidingly align with a water inlet conduit 56. Water stem 52 extends through opening 33 in the valve housing, and is maintained at its upper end through packing 41. Water stem 52 and plug 27 are slidingly adjustable within the bonnet cavity 30a. A perforated sleeve 58 surrounds the water stem at the upper end. The sleeve perforations 58a are adjacent to the upper end of water stem 52 and permit water to flow from the water conduit 56 into the holes 54 in water stem 52. The diameter of the valve seat is between 1.0 and 2.0 inches. Because of the small diameter of the trim, the stem and plug assembly are manufactured from a single piece.

Figure 2:
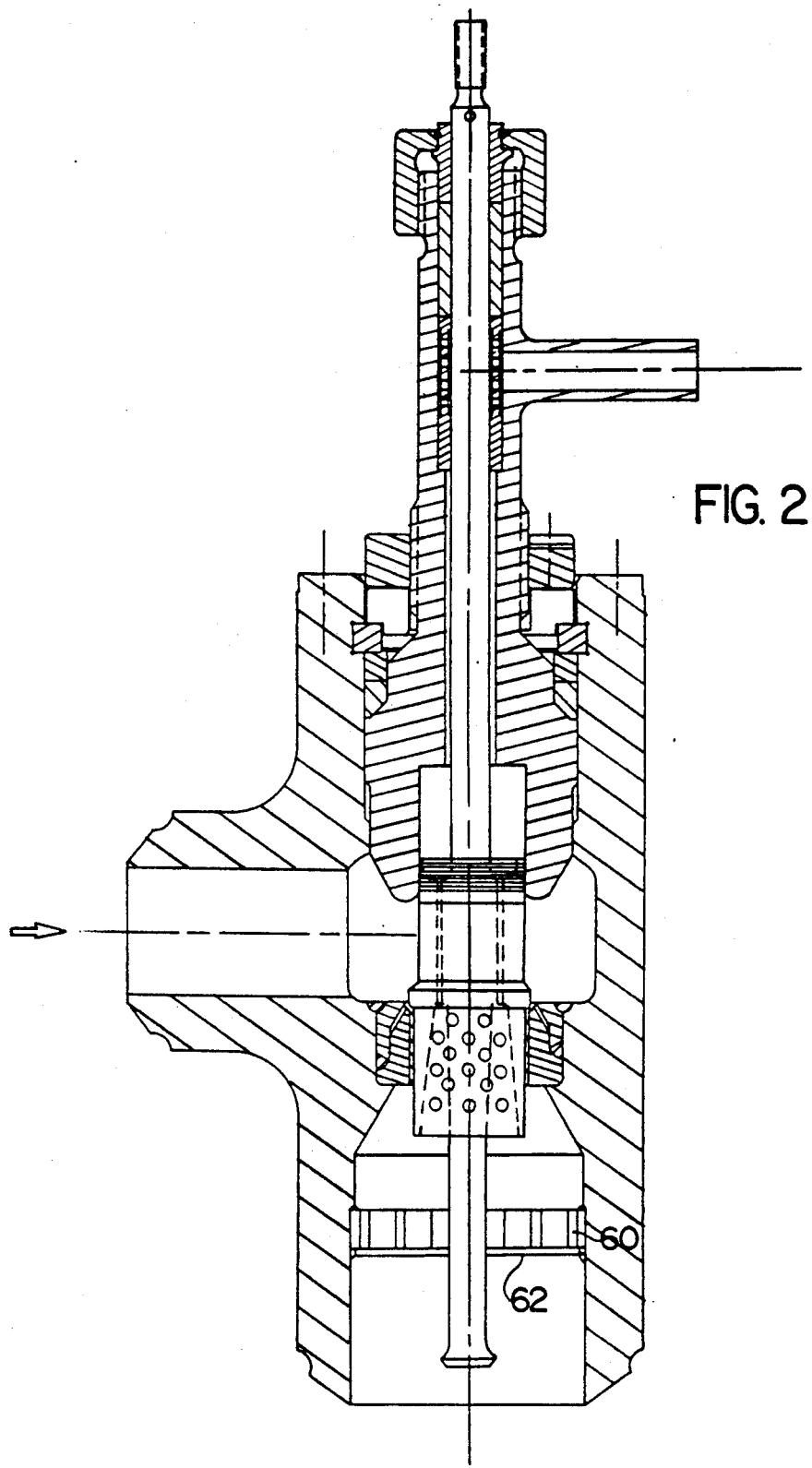
FIG. 2 is a section view of the conditioning valve of the preferred embodiment with a diffuser plate, held in place by a welded in retaining ring.

Referring to FIG. 2, the conditioning valve of FIG. 1 is shown including a diffuser plate 60. Diffuser plate 60 is retained in position by a retaining ring 62 which is welded into the body.

Figure 3:
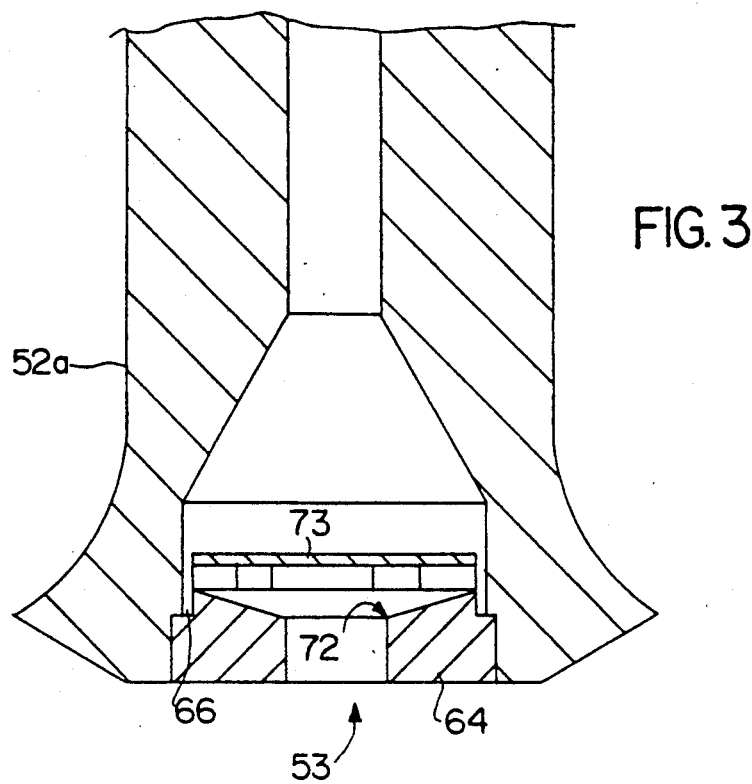
FIG. 3 is a section view of the nozzle and water stem of the preferred embodiment.
Figure 3A:
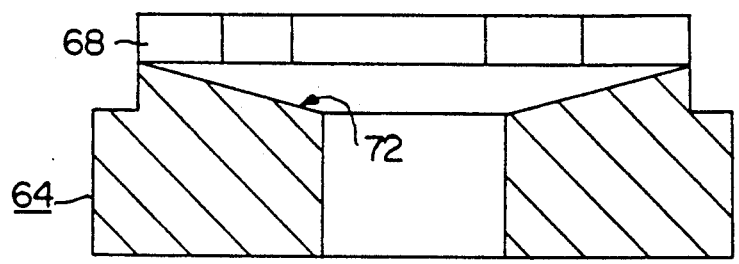
FIG. 3A is a section view of the nozzle of FIG. 3.
Figure 3B:
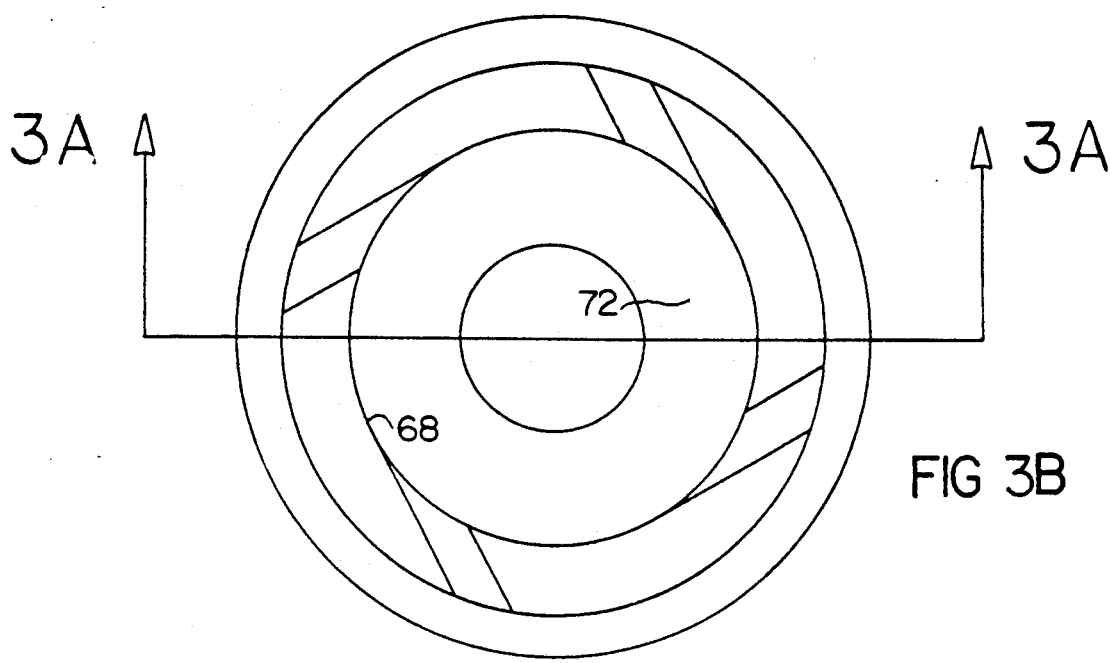
FIG. 3B is a plan view of the nozzle of FIG. 3A.
Figure 3C:
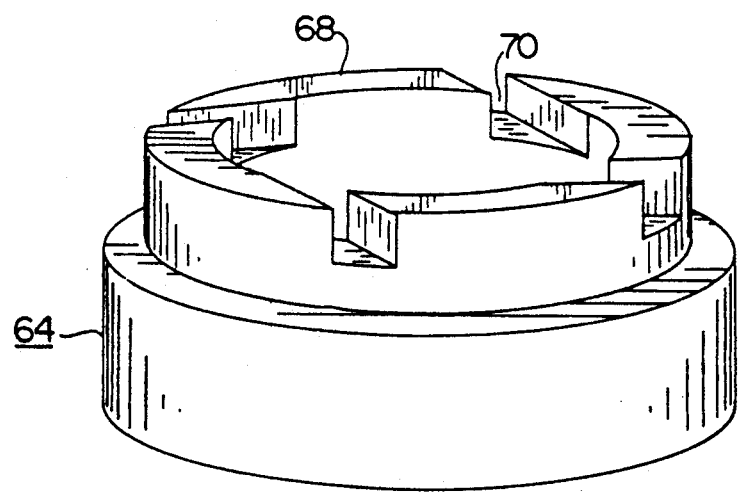
FIG. 3C is an elevated perspective view of the nozzle of the preferred embodiment.

The water outlet nozzle is now described with reference to FIG. 3. Referring to FIGS. 3A–3C, the lower most portion of the water stem 52 is shown. The water stem has an outlet 53 which comprises a nozzle 64 which is retained at the lowermost portion of the stem 52a. The nozzle 64 is inserted into the water stem, and comprises a single piece. Nozzle 64 comprise an annular lip 66 which attaches to the end of the water stem 53 and an upper portion comprising a swirler 68 and acceleration chamber 72. Swirler 68 is covered by a washer 73. The swirler 68 contains a plurality of tangential downwardly extending water passages 70 which tend to create a swirling vortex of water. The vortex of water exits a hollow acceleration cylinder 72 affixed to the end of the nozzle where it enters the outlet chamber 20.

The operation of the conditioning valve invention is now described with reference to FIGS. 1, 1A, 2 and 3–3C. Referring to FIG. 1A, the conditioning valve of the present invention is shown in the open position. Stem and plug assembly are pulled upward. The upward movement accordingly pulls valve stem 52 and plug 27 into bonnet cavity 30a via the labyrinth 36. Steam flows into the body 12 through inlet port 14 over seat 22 and through the perforations in perforated cage 29 which provides pressure reduction. The steam then flows down through seat 22 and enters the outlet chamber. In the fully open position, the plug shoulder butts the back seat at the lower end of the bonnet and eliminates steam flow to the cavity 30a.

Simultaneously, the water holes 54 in the upper portion of the stem assembly 40 are aligned with perforations 58a and water inlet conduit 56. Cooling water is injected down the stem and out the nozzle 64. Labyrinth 36 functions to reduce superheated steam leakage from the inlet chamber to the bonnet cavity 30a. The steam and water mix in an area of a high degree of turbulence and the temperature is reduced. By gradually moving the stem and plug upward, a precise number of perforations are open in the cage 29, and upper stem 54. The amount of desuperheating water injected is therefore directly proportional to the amount of steam flowing through the valve.

Because of the unique design of the above described water nozzle and the fluid dynamics of the valve, the water mixes thoroughly with the steam in outlet chamber 20 without impinging on the inner walls of the valve body. Steam, reduced in both pressure and temperature, is discharged into the downstream piping fully conditioned, so as not to cause harm to downstream instrumentation machinery, or valves. In the fully open position, the plug shoulder hits the back seat at the lower end of the bonnet and eliminates steam flow to the cavity 30a. The labyrinth grooves can collect small particles of dirt and salt which are found in steam flows. The labyrinth builds down the high steam pressure and provides a controlled leakage. The labyrinth eliminates the piston rings, inherent ring costs and possible wear problems.

FIG. 1 discloses the stem and cage plug assembly in the closed position. As shown, the water stem 52 and plug 27 are pushed downward and superimposed over the annular seat 22. Plug 27 contains a limited number of openings which permit a controlled leakage of steam through to the outlet chamber. The controlled leakage heats the outlet chamber 20 and operates both to remove accumulated condensate and to prevent thermal shock when the valve opens as in FIG. 1A. The holes 54 in upper water stem are pulled down away from the water inlet conduit and the perforated water sleeve 58. Thus, none of the holes in the inner cage are exposed to the steam or water flow.

FIGS. 4-7 illustrate additional embodiments of the preferred embodiment. The embodiments of FIGS. 4-7 are directed to pressure reduction valves and incorporate balanced plugs and non-balanced tight plugs without silencer cages.

Figure 4:
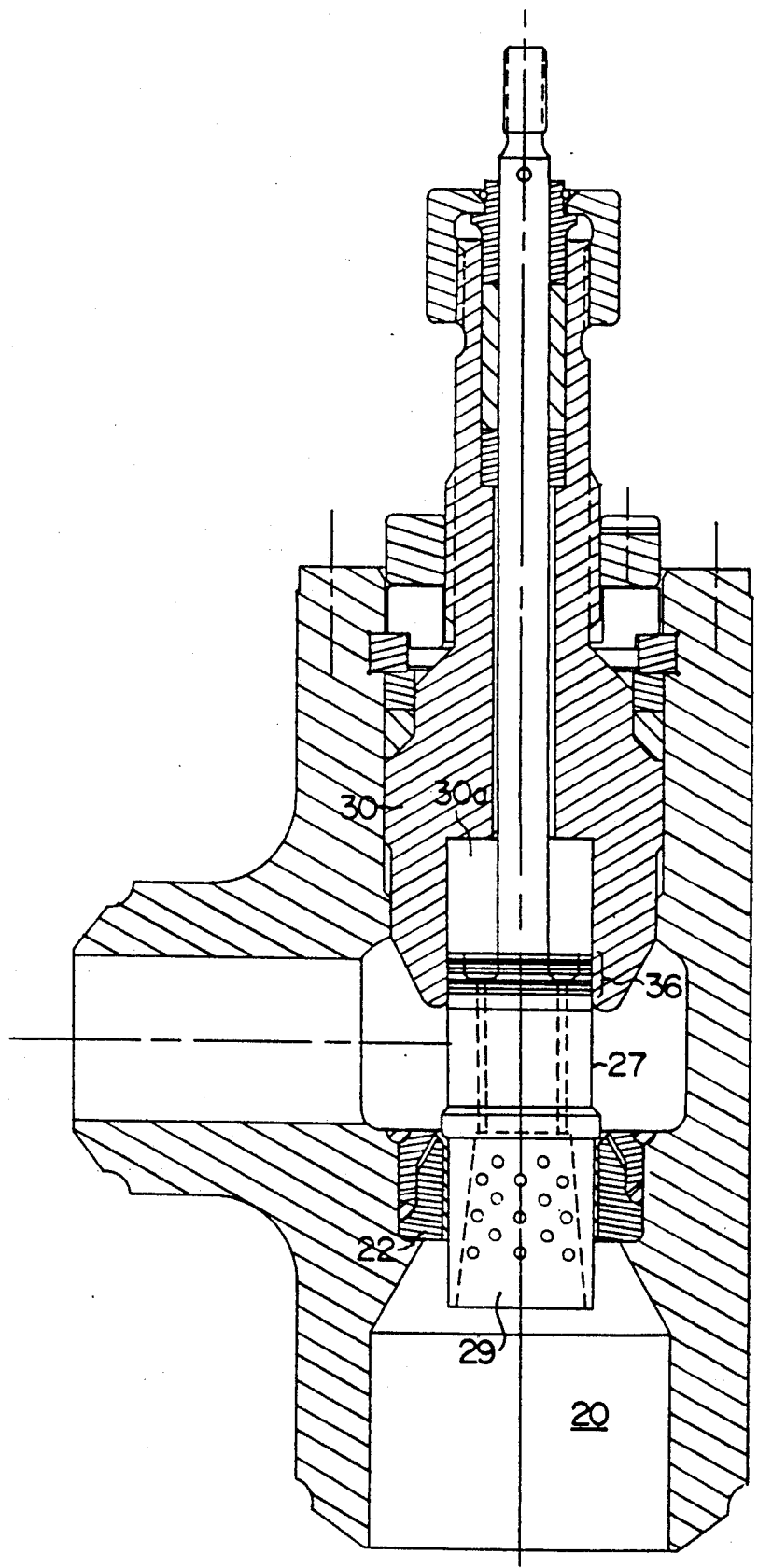
FIG. 4 is a section view of a balanced plug pressure reducing valve of the present invention.

FIG. 4 illustrates a balanced pressure reducing valve. The valve of FIG. 4 is identical to that of FIG. 1 except that it does not include the water steam conditioning apparatus. The valve incorporates the single piece valve and stem assembly of FIGS. 1 and 1A. The plug 27 further includes a labyrinth 36 which facilitates its movement through the bonnet 30 and reduces the steam leakage. The labyrinth groves can collect small particles of dirt and salt which are found in steam flows. The labyrinth builds down the high steam pressure. The labyrinth eliminates the piston rings and the inherent ring cost, and possible wear problems. In operation the plug is retracted by stem into a bonnet cavity 30a, exposing perforated cage portion 29. When closed, the plug 27 permits a constant leakage of steam into the outlet chamber 20.

Figure 5A:
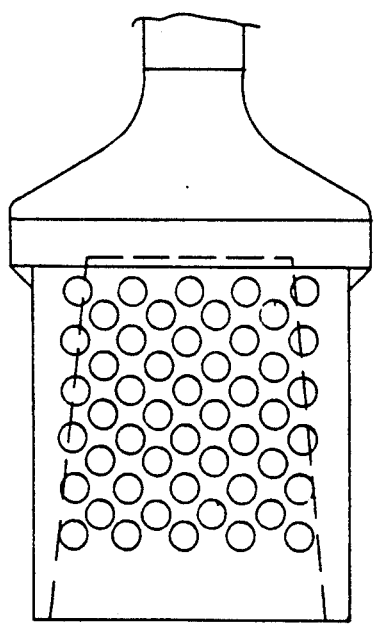
FIG. 5A is an isolated section view of the perforated cage of the non-balanced pressure reduction valve of FIG. 5.
Figure 5:
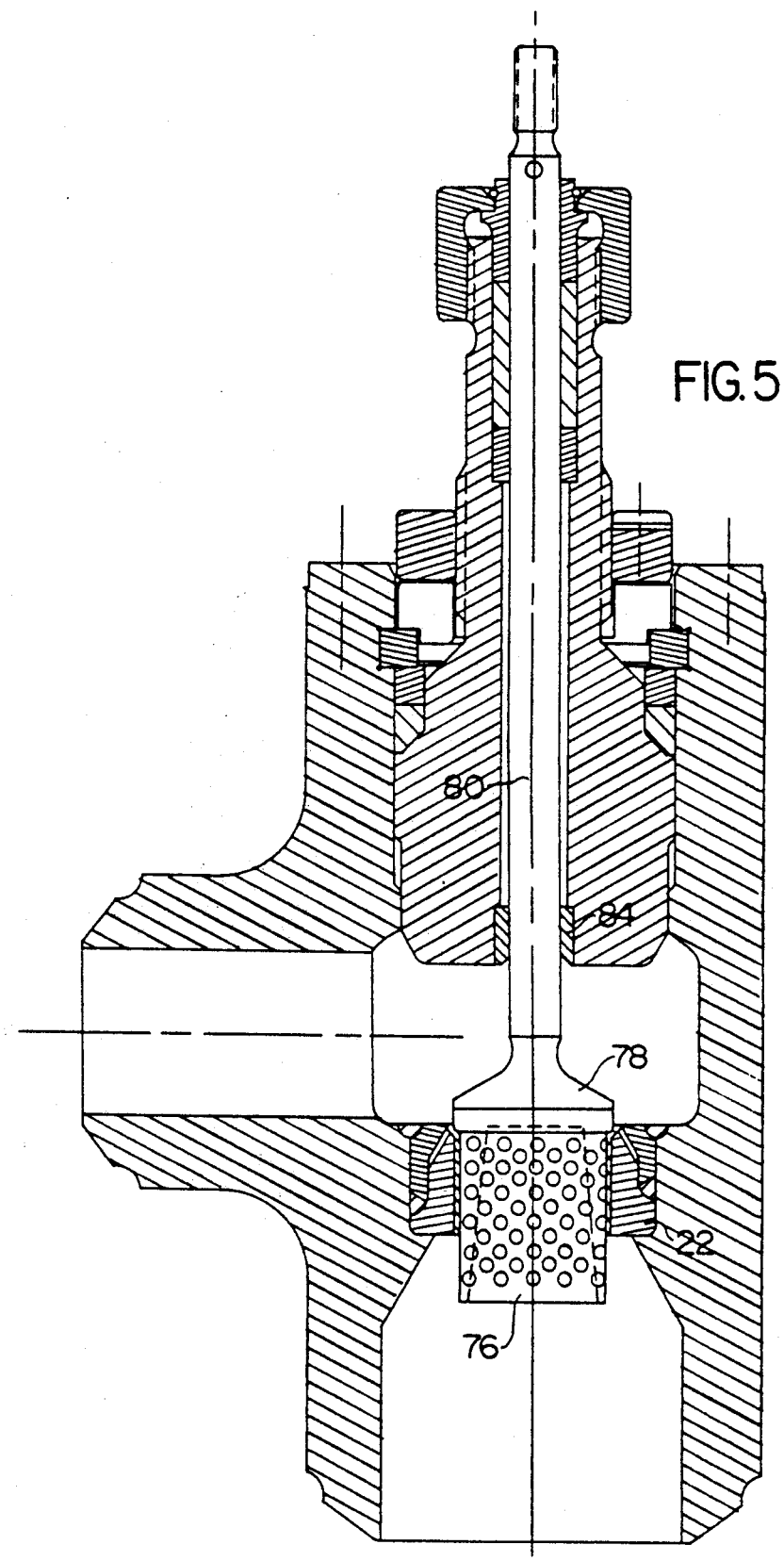
FIG. 5 is a section view of a non-balanced pressure reduction valve in accordance with the present invention.
Figure 6:
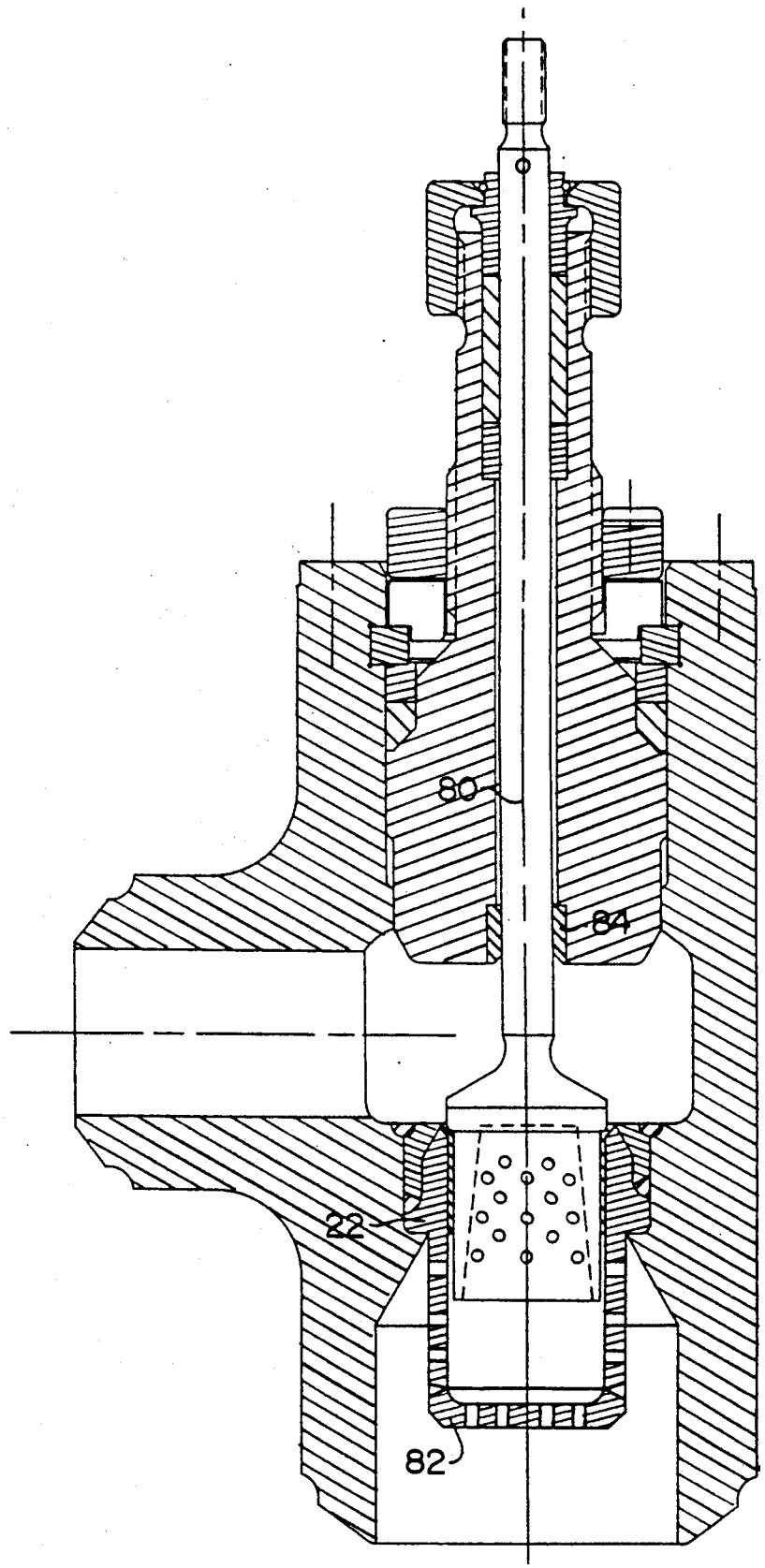
FIG. 6 is a non-balanced tight plug pressure reduction valve with silencer cage in accordance with the present invention.

FIGS. 5 & 6 illustrate non-balanced tight plug designs. The plug of FIG. 5 consists of a single cylindrical perforated retractable plug 76. The plug has a solid top section 78 which mates with seat 22 to provide a tight seal. As shown more particularly in FIG. 5A, solid top section 78 serves as a plug, and is retracted by stem 80 to expose its perforated outer casing 76. The holes on the perforated outer overlap. The overlapping is necessary to get a smooth and ripple free linear flow characteristic. In addition, the top row of holes is smaller. After stroking the valve over a dead band (typically 1/25"), the fluid starts to flow through the smaller top holes in the plug. FIG. 6 shows the plug of FIG. 5 with a silencer cage 82 which forms an integral part of the seat 22 and extends into outlet chamber 20. The silencer cage 82 is constructed from heat resistant low alloyed carbon steel. The bonnets in FIGS. 5 & 6 do not contain cavity 30a to receive the retracted valve assembly. The respective plugs are activated by a stem 80 which is retained within the bonnet and guided by a stellite guide bushing 84 which also provides for a backseat in fully open position.

Figure 7:
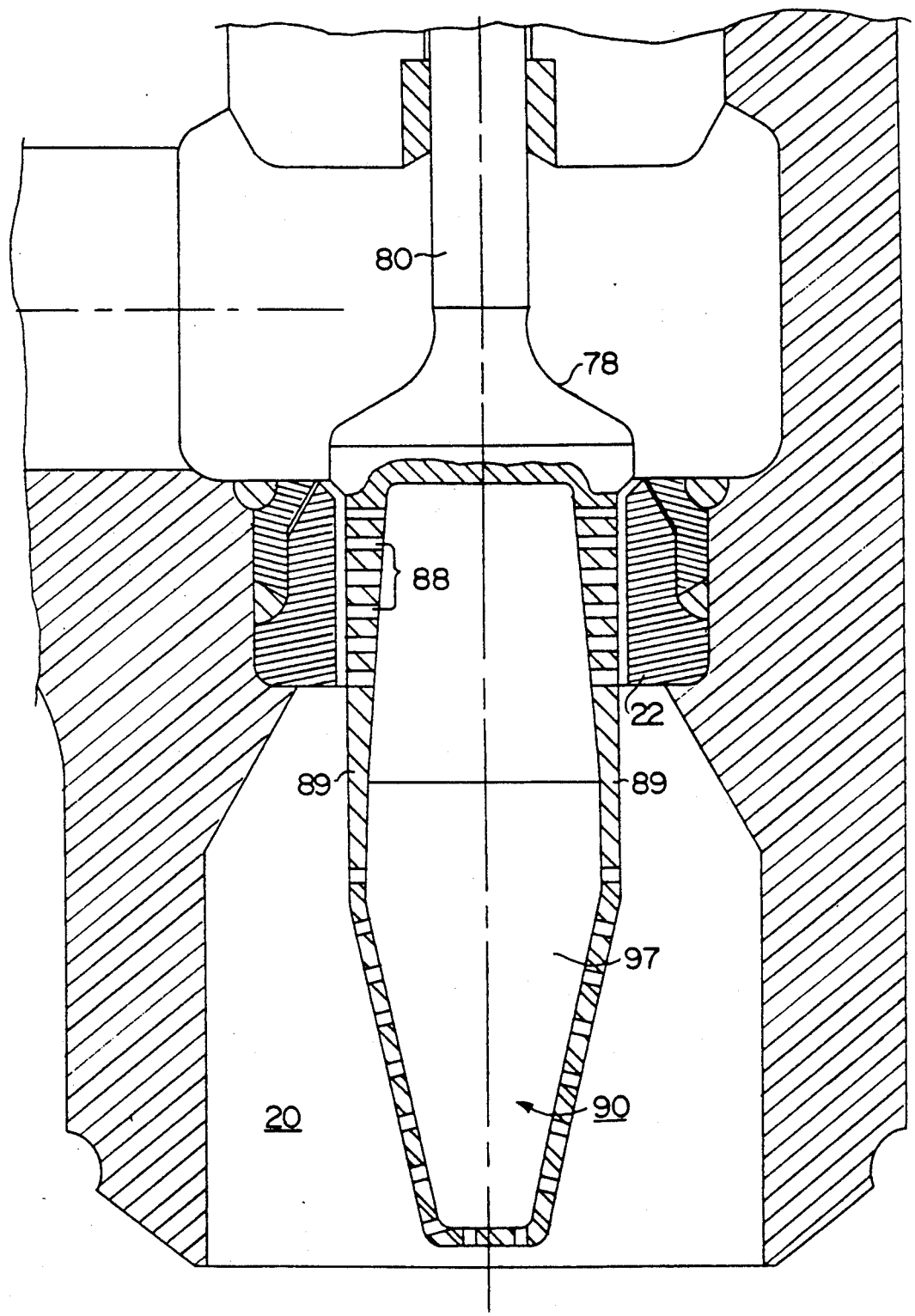
FIG. 7 is an enhanced view of a low noise silencer cage plug for the pressure reduction valve of the present invention.

FIG. 7 illustrates a non-balanced tight plug with a low noise silencer cage 90. Like the embodiments of FIGS. 5 and 6, the plug of FIG. 7 has solid top section 78 which provides a tight seal with seat 22.

The plug is constructed of martensitic steel and contains a plurality of apertures 88 for steam. The silencer section has a perforated casing constructed from high temperature resistant martensitic stainless steel and extends into the outlet chamber 20. The plug and silencer section are welded together 89 by an electron beam. The silencer 90 is filled with stainless steel metal foam 97 which contains 90% free flow space. The pressure loss in the foam is therefore very small. In operation, the metal foam with its thousands of small flow paths splits the high energy single flow into many low energy jets and drastically reduces sound pressure levels in the frequency range 30-15,000 $H_z$. In operation, the perforated plug is lifted by the stem 80 to permit steam to move between the inlet and outlet chambers through the silencer 90.

The silencer is constructed from metal foam made of material such as nickel and nickel chrome. The material has several advantages. Among these, are that it splits-up the single flow jet into hundreds and thousands of low energy jets. Secondly, it provides a low pressure drop. Third, the material has a high porosity and is extremely light. Fourth, it is corrosion-resistant and can be compacted to fit into almost any construction.

Figure 8:
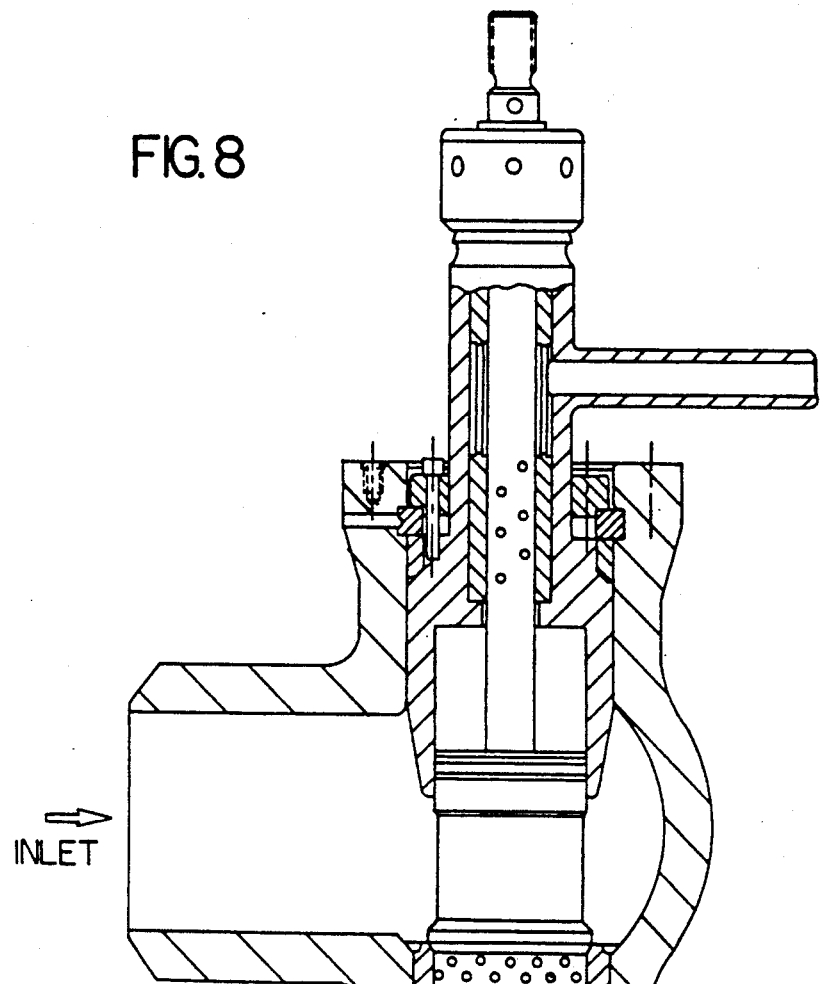
FIG. 8 is a section view of the conditioning valve of FIG. 2 with diffuser plate incorporating metal foam.
Figure 8A:
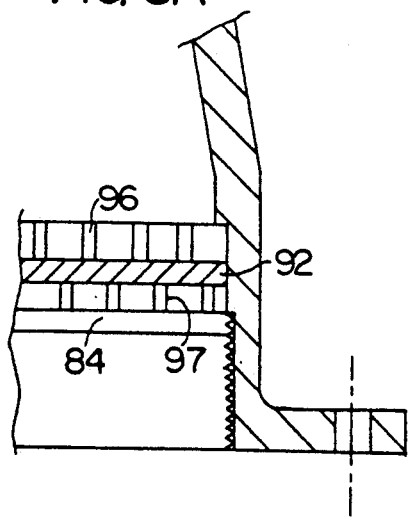
FIG. 8A is an isolated view of an alternative configuration for the conditioning valve of FIG. 8.

FIG. 8 shows the steam conditioning valve of FIGS. 1 and 2 with a retaining ring. The retaining ring supports a layer of the metal foam 92 of the present invention. In an alternative embodiment shown in FIG. 8A, the foam is sandwiched between the threaded ring 94, diffuser plate 96 and diffuser ring 97.

Figure 9:
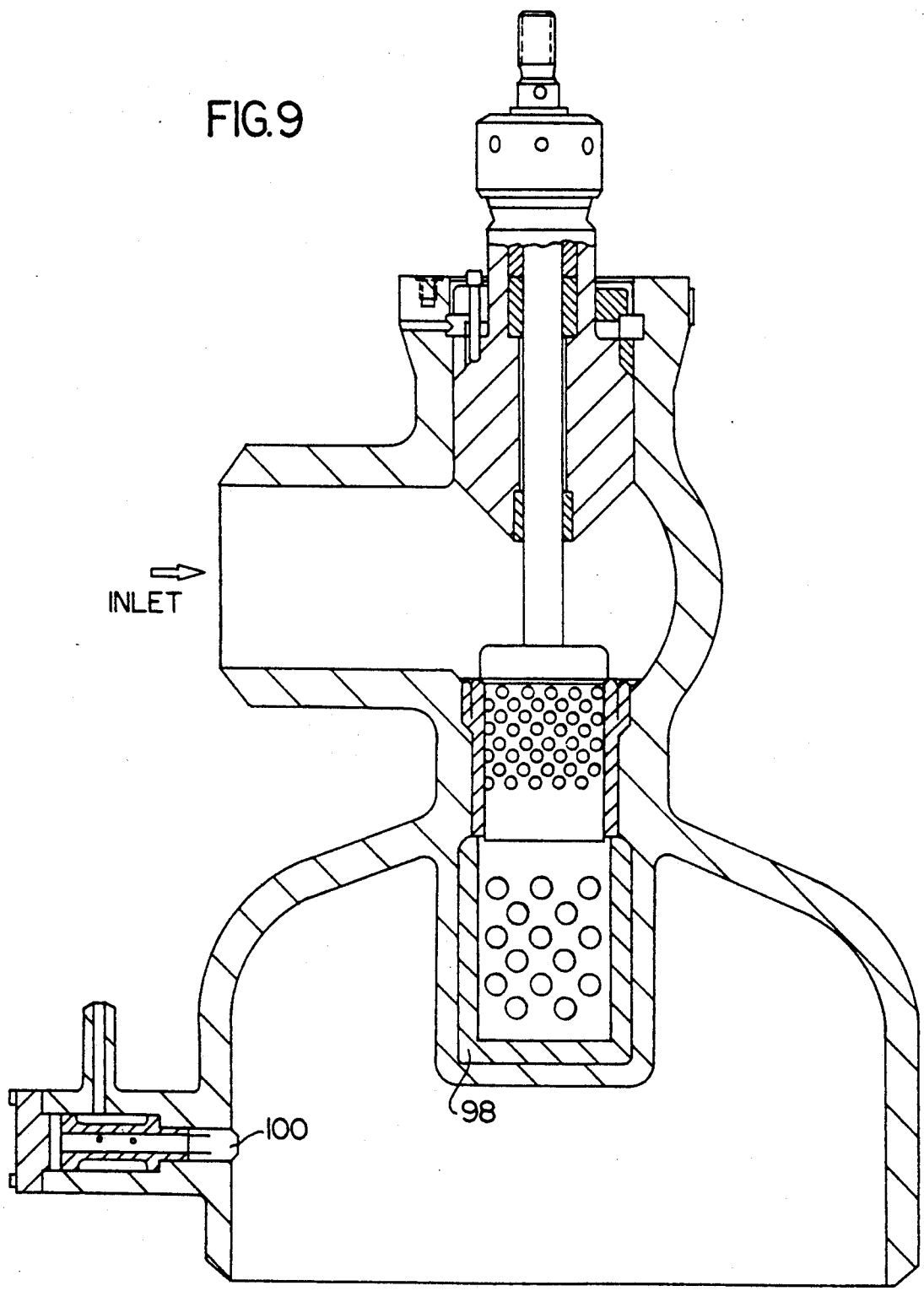
FIG. 9 is a section view of an alternative conditioning valve which utilizes the metal silencing foam of the present invention.

FIG. 9 illustrates the use of the metal foam 98 in an alternative conditioning and pressure reducing valve. In this embodiment, water injection enters through the outlet chamber 100.

It will be recognized by those skilled in the art that changes may be made to the above-described embodiments of the invention without departing from the broad inventive concepts thereof. It is understood, therefore, that this invention is not limited to the particular embodiment disclosed, but is intended to cover all modifications which are within the scope and spirit of the invention as defined by the claims appended hereto.

What is claimed is:

1. A conditioning valve for simultaneously reducing the pressure and temperature of incoming steam comprising:
   a valve body divided into first and second chambers, said first chamber having an inlet port for introducing superheated steam under high pressure into said conditioning valve, said second chamber having an outlet port for expelling conditioned steam out of said conditioning valve;

an annular seat affixed to the interior of said valve body between said first and second chambers;

cylindrical valve means slidably matable with said annular seat and extending between said first and second chambers, said cylindrical valve means having a plurality of perforations over a portion of its body to permit the flow of steam between said first and second chambers when the cylindrical valve means is in a first position, said perforations being closed off from said flow of steam when said cylindrical valve means is in a second position, said cylindrical valve means having additional perforations to permit a controlled leakage of steam when said cylindrical valve means is in said second position;

a water stem extending through said cylindrical valve means and terminating in said second chamber for transporting desuperheating water to said second chamber, said stem being coupled to said cylindrical valve means and slidably adjusting said cylindrical valve means between said first and second positions; and nozzle means located at the terminal end of said water stem for injecting desuperheating water into said second chamber to be mixed with steam entering said second chamber, said nozzle means comprising a plurality of tangentially extending conduits which generate a swirling vortex of water and a hollow cylindrical sleeve extending into said second chamber for transporting and accelerating said swirling vortex of water into said second chamber.

2. The conditioning valve of claim 1 further comprising a water valve operatively coupled to said water stem means for controlling the flow of desuperheating water into said water stem means, said water valve opening when said cylindrical valve is in said second position and closing when said cylindrical valve is in said first position.

3. The conditioning valve of claim 1 wherein the water valve comprises perforations in the upper portion of said valve stem which are aligned with a water inlet conduit when said cylindrical valve is in said first position and blocked from said inlet conduit when said cylindrical valve is in said second position.

4. The conditioning valve of claim 1 wherein said water stem comprises a water tube.

5. A valve for reducing the pressure of steam comprising:

a valve body divided into first and second chambers, said first chamber having an inlet port for the introduction of superheated steam under high pressure into said conditioning valve, said second chamber having an outlet port for expelling depressurized steam out of said valve;

an annular seat affixed to the interior of said valve between said first and second chambers;

a hollow cylindrical cage being slidably matable with said seat, said cage having first perforations which permit the flow of steam between said first and second chambers when said cage is retracted in a first position, said perforations being closed off to prevent said flow of steam when said cage is in a second position, said cage having additional perforations which permit a controlled leakage of steam from said first to second chambers when said cage is in said second position, said controlled leakage tending to heat said second chamber and removing accumulated condensate therein;

means coupled to said cage for adjusting said cage between said first and second positions;

a bonnet having a cavity to hold and support said retracted slidable cage and adjusting means;

means to facilitate slidable movement of said cage within said bonnet cavity;

and a backseat on said slidable cage to provide a tight seal with said bonnet when said cage is retracted in said first position.

6. A valve for reducing the pressure of steam comprising:

a valve body divided into first and second chambers, said first chamber having an inlet port for the introduction of superheated steam under high pressure into said conditioning valve, said second chamber having an outlet port for expelling depressurized steam out of said valve;

an annular seat affixed to the interior of said valve between said first and second chambers;

a hollow cylindrical cage being slidably matable with said seat, said cage having first perforations which permit the flow of steam between said first and second chambers when said cage is retracted in a first position, said perforations being closed off to prevent said flow of steam when said cage is in a second position, said cage having additional perforations which permit a controlled leakage of steam from said first to second chambers when said cage is in said second position, said controlled leakage tending to heat said second chamber and removing accumulated condensate therein;

means coupled to said cage for adjusting said cage between said first and second positions;

a bonnet having a cavity to hold and support said retracted slidable cage and adjusting means;

means to facilitate slidable movement of said cage within said bonnet cavity;

a silencer cage coupled to said seat and extending into said second chamber;

and sound absorbent metal foam having approximately 90% free flow space contained within said silencer cage.

* * * * *